(12) United States Patent
Liu et al.

(10) Patent No.: US 10,779,309 B2
(45) Date of Patent: Sep. 15, 2020

(54) COMMUNICATION METHOD AND DEVICE (71) Applicant: Beijing Xiaomi Mobile Software Co., Ltd., Beijing (CN)

(72) Inventors: Yang Liu, Beijing (CN); Juejia Zhou, Beijing (CN); Ming Zhang, Beijing (CN)

(73) Assignee: Beijing Xiaomi Mobile Software Co., Ltd., Bejing (CN)

( * ) Notice: Subject to any disclaimer, the term of this patent is extended or adjusted under 35 U.S.C. 154(b) by 0 days.

(21) Appl. No.: 16/369,238

(22) Filed: Mar. 29, 2019

(65) Prior Publication Data

US 2019/0230684 A1    Jul. 25, 2019

Related U.S. Application Data

(63) Continuation of application No. PCT/CN2016/101066, filed on Sep. 30, 2016.

(51) Int. Cl.
| | |
|---|---|
| *H04L 12/28* | (2006.01) |
| *H04W 72/12* | (2009.01) |
| *H04W 72/04* | (2009.01) |
| *H04W 56/00* | (2009.01) |
| *H04W 48/10* | (2009.01) |

(52) U.S. Cl.
CPC ....... *H04W 72/1257* (2013.01); *H04W 48/10* (2013.01); *H04W 56/001* (2013.01); *H04W 72/0446* (2013.01); *H04W 72/0453* (2013.01)

(58) Field of Classification Search
CPC ...................................................... H04L 12/28
(Continued)

(56) References Cited

U.S. PATENT DOCUMENTS

2009/0274086 A1    11/2009 Petrovic et al.
2013/0250878 A1    9/2013 Sayana et al.
(Continued)

FOREIGN PATENT DOCUMENTS

| CN | 103929779 A | 7/2014 |
|---|---|---|
| CN | 105684474 A | 6/2016 |

(Continued)

OTHER PUBLICATIONS

English translation of International Search Report of PCT Application No. PCT/CN2016/101066, dated May 31, 2017, issued by the ISA/CN—State Intellectual Property Office of the P.R. China.
(Continued)

*Primary Examiner* — Dang T Ton
(74) *Attorney, Agent, or Firm* — Finnegan, Henderson, Farabow, Garrett & Dunner, L.L.P.

(57) ABSTRACT

Disclosed are a communication method and device. In the method, a first time-frequency resource and a second time-frequency resource are determined, the first time-frequency resource and the second time-frequency resource are at different second unit scheduling times within a same first unit scheduling time in a time domain and have different core frequency bands in a frequency domain. The first time-frequency resource has a first subcarrier interval in the frequency domain, and the second time-frequency resource has a second subcarrier interval that is different from the first subcarrier interval in the frequency domain. Each first unit scheduling time may include at least two second unit scheduling times. An information block is broadcast on the first time-frequency resource and the second time-frequency resource.

17 Claims, 5 Drawing Sheets

(58) Field of Classification Search
USPC .......................................................... 270/329
See application file for complete search history.

(56) References Cited

U.S. PATENT DOCUMENTS

| | | |
|---|---|---|
| 2015/0188650 A1 | 7/2015 | Au et al. |
| 2015/0341908 A1 | 11/2015 | Wang et al. |
| 2015/0358996 A1 | 12/2015 | Fang et al. |
| 2016/0269872 A1 | 9/2016 | Kim et al. |
| 2020/0036457 A1* | 1/2020 | Yu M; Kunil ........ H04L 5/0048 |

FOREIGN PATENT DOCUMENTS

| | | |
|---|---|---|
| CN | 105850177 A | 8/2016 |
| EP | 1 909 523 A1 | 4/2008 |
| EP | 2 945 454 A1 | 11/2015 |

OTHER PUBLICATIONS

English translation of the Written Opinion of the International Searching Authority of PCT Application No. PCT/CN2016/101066, dated May 31, 2017.
Extended Search Report for European Application No. 16917270.7 from the European Patent Office, dated Jul. 16, 2019.
First Office Action dated Aug. 20, 2019, in counterpart Chinese Application No. 201680000975.1 and English translation thereof.
$3^{rd}$ Generation Partnership Project; Technical Specification Group Radio Access Network; Evolved Universal Terrestrial Radio Access (E-UTRA); Radio Resource Control (RRC); Protocol specification (Release 9); 3GPP TS 36.331 V9.15.0 (Jun. 2013).

\* cited by examiner

COMMUNICATION METHOD AND DEVICE

CROSS-REFERENCE TO RELATED APPLICATION

This is a continuation application of International Application No. PCT/CN2016 01066, filed on Sep. 30, 2016, the entire contents of which are incorporated herein by reference.

TECHNICAL FIELD

The present disclosure generally relates to the technical field of mobile communication, and more particularly, to a communication method and device.

BACKGROUND

In recent years, the mobile communication technology has been rapidly developed to provide better communication services. In a current communication system, user equipment (UE) accesses a base station through an information block, such as a master information block (MIB) or a synchronization signal block (SSB), broadcast by the base station, thereby communicating with the base station.

In order to enable a UE to access a base station within the UE's geographical range at any time, the base station broadcasts an information block at a fixed time interval, and the information block includes basic configuration information of the base station such as a system bandwidth, a system frame number and an antenna number. When searching and identifying an information block of a certain base station, the UE may access the base station according to configuration information, indicated by the information block, of the base station and further communicate with the base station.

There are at least the following problems in the related art. Nowadays, development of a 5th-Generation (5G) mobile communication technology has become an inevitable trend. Besides the existing wireless broadband access service, the 5G mobile communication technology expands a new reliable and low-delay service. However, the UE in the reliable and low-delay service has a relatively higher requirement on an access delay, and therefore, the existing communication method may not meet the UE's requirement on rapid access to a base station.

SUMMARY

According to a first aspect of the present disclosure, a communication method is provided. The method may include: determining a first time-frequency resource and a second time-frequency resource, wherein the first time-frequency resource and the second time-frequency resource are at different second unit scheduling times within a same first unit scheduling time in a time domain and have different core frequency bands in a frequency domain, a subcarrier interval of the first time-frequency resource in the frequency domain is different from a subcarrier interval of the second time-frequency resource in the frequency domain and at least two second unit scheduling times are included in each first unit scheduling time; and broadcasting an information block on the first time-frequency resource and on the second time-frequency resource.

According to a second aspect of the present disclosure, a communication method is provided, which may include: determining different core frequency bands of a first time-frequency resource and a second time-frequency resource in a frequency domain, wherein the first time-frequency resource and the second time-frequency resource are at different second unit scheduling times within a same first unit scheduling time in a time domain and at least two second unit scheduling times are included in each first unit scheduling time; searching, in the different core frequency bands, for an information block broadcast by a base station at a first subcarrier interval and a second subcarrier interval; and performing a subsequent communication process with the base station on the basis of the information block.

According to a third aspect of the present disclosure, a communication device is provided. The communication device may include: a processor; and a memory configured to store an instruction executable for the processor. The processor may be configured to: determine a first time-frequency resource and a second time-frequency resource, wherein the first time-frequency resource and the second time-frequency resource are at different second unit scheduling times within a same first unit scheduling time in a time domain and have different core frequency bands in a frequency domain, a subcarrier interval of the first time-frequency resource in the frequency domain is different from a subcarrier interval of the second time-frequency resource in the frequency domain and at least two second unit scheduling times are included in each first unit scheduling time; and broadcast an information block on the first time-frequency resource and the second time-frequency resource.

According to a fourth aspect of the present disclosure, a communication device is provided, which may include: a processor; and a memory configured to store an instruction executable for the processor. The processor may he configured to: determine different core frequency bands of a first time-frequency resource and a second time-frequency resource in a frequency domain, wherein the first time-frequency resource and the second time-frequency resource are at different second unit scheduling times within a same first unit scheduling time in a time domain and at least two second unit scheduling times are included in each first unit scheduling time; search, in the different core frequency bands, for an information block broadcast by a base station at a first subcarrier interval and a second subcarrier interval; and perform a subsequent communication process with the base station on the basis of the information block.

According to a fifth aspect of the disclosure, there is provided a non-transitory computer-readable storage medium having stored therein instructions that, when executed by a processor, cause the processor to perform operations including: determining a first time-frequency resource and a second time-frequency resource, wherein the first time-frequency resource and the second time-frequency resource are at different second unit scheduling times within a same first unit scheduling time in a time domain and have different core frequency bands in a frequency domain, a subcarrier interval of the first time-frequency resource in the frequency domain is different from a subcarrier interval of the second time-frequency resource in the frequency domain and at least two second unit scheduling times are included in each first unit scheduling time; and broadcasting an information block on the first time-frequency resource and on the second time-frequency resource.

According to a sixth aspect of the disclosure, there is provided a non-transitory computer-readable storage medium having stored therein instructions that, when executed by a processor, cause the processor to perform operations including: determining different core frequency bands of a first time-frequency resource and a second time-frequency resource in a frequency domain, wherein the first time-frequency resource and the second time-frequency resource are at different second unit scheduling times within a same first unit scheduling time in a time domain and at least two second unit scheduling times are included in each first unit scheduling time; searching, in the different core frequency bands, for an information block broadcast by a base station at a first subcarrier interval and a second subcarrier interval; and performing a subsequent communication process with the base station on the basis of the information block.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Implementations of the present disclosure will be further described below reference to the accompanying drawings in detail.

Figure 1:
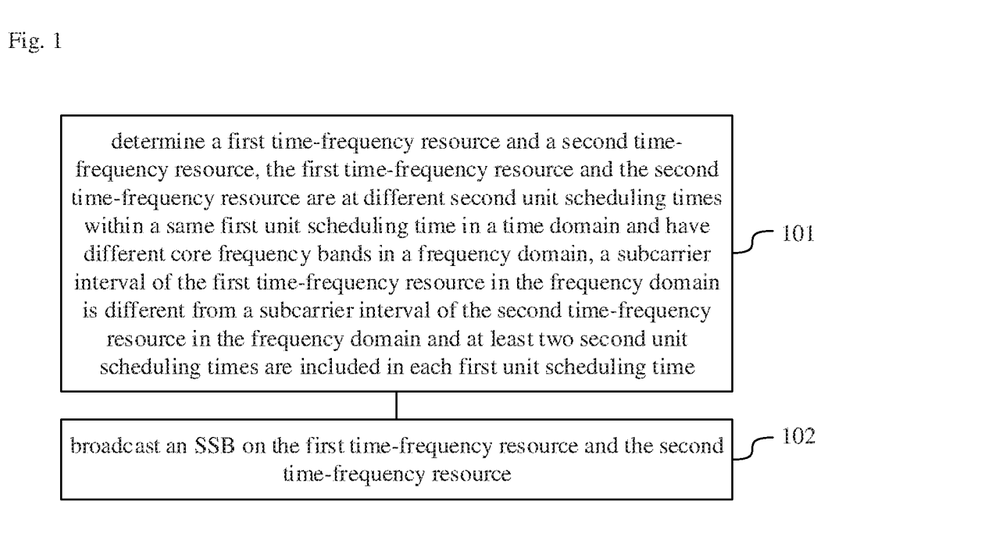
FIG. 1 is a flow chart of a communication method, according to exemplary embodiments.

FIG. 1 is a flow chart of a communication method according to an exemplary embodiment. As shown in FIG. 1, the method may include the following steps.

In Step 101, a first time-frequency resource and a second time-frequency resource are determined. The first time-frequency resource and the second time-frequency resource are at different second unit scheduling times within a same first unit scheduling time in a time domain and have different core frequency bands in a frequency domain, and a subcarrier interval of the first time-frequency resource in the frequency domain is different from a subcarrier interval of the second time-frequency resource in the frequency domain, where at least two second unit scheduling times are included in each first unit scheduling time. For example, the first time-frequency resource has a first subcarrier interval in the frequency domain, the second time-frequency resource has a second subcarrier interval that is different from the first subcarrier interval in the frequency domain.

Here, the core frequency may be a frequency band according to a 5G communication standard in a specific region or country. The first unit scheduling time may be an individual period of time in the time domain, which may exist continuously in the time domain. The first unit scheduling tune may include a plurality of second unit scheduling times. For example, the first unit scheduling time may be 10 ms and the second unit scheduling time may be 5 ms.

In Step 102, an information block, such as a master information block (MIB) or a synchronization signal block (SSB), is broadcast on the first time-frequency resource and the second time-frequency resource. The first time-frequency resource and the second time-frequency resource have different subcarrier intervals in the frequency domain. For example, the first time-frequency resource may have a first subcarrier interval between 1.0 KHz and 20 KHz. The second time-frequency resource may have a second subcarrier interval between 40 KHz and 80 KHz. More specifically, the first subcarrier interval may be 15 KHZ while the second subcarrier interval may be 60 KHZ or 30 KHZ.

For illustrative purposes only, it is assumed that the information block in the embodiment is an MIB. While the embodiment has been described based on the MIB, the method is not so limited. It may be practiced with equal effectiveness with other information blocks such as an SSB.

Generally, a base station broadcasts an MIB at a fixed time interval, thereby providing a communication service for a UE in a wireless broadband access service.

Development of a 5G mobile communication technology has become an inevitable trend. Besides the existing wireless broadband access service, the 5G mobile communication technology expands a new reliable and low-delay service. However, the UE in the reliable and low-delay service has a relatively higher requirement on an access delay, and therefore, the existing communication method may not meet the UE's requirement on rapid access to a base station. The UE may include a mobile phone, a smart watch, a laptop, a tablet, or any other mobile device.

In embodiments of the present disclosure, since the base station broadcasts the MIB on the first time-frequency resource and the second time-frequency resource, and the first time-frequency resource and the second time-frequency resource have different subcarrier intervals in the frequency domain, reliable low--delay UE may find the MIB at a first subcarrier interval, or may find the MIB at a second subcarrier interval; since the first time-frequency resource and the second time-frequency resource are at different second unit scheduling times in the same first unit scheduling time in the time domain, the UE may find the MIB within less than a first unit scheduling time; and therefore, the delay of access of the UE to the base station may be reduced, and the requirement of the UE on rapid access to the base station may be met.

In an embodiment, a difference between the first time-frequency resource and the second time-frequency resource in the time domain is a half of the first unit scheduling time.

In an embodiment, the subcarrier interval of the first time-frequency resource in the frequency domain is 15 KHZ, and the subcarrier interval of the second time-frequency resource in the frequency domain is 60 KHZ or 30 KHZ.

All of the above technical solutions may be freely combined to form additional embodiments of the present disclosure, which will not be elaborated one by one herein.

Figure 2:
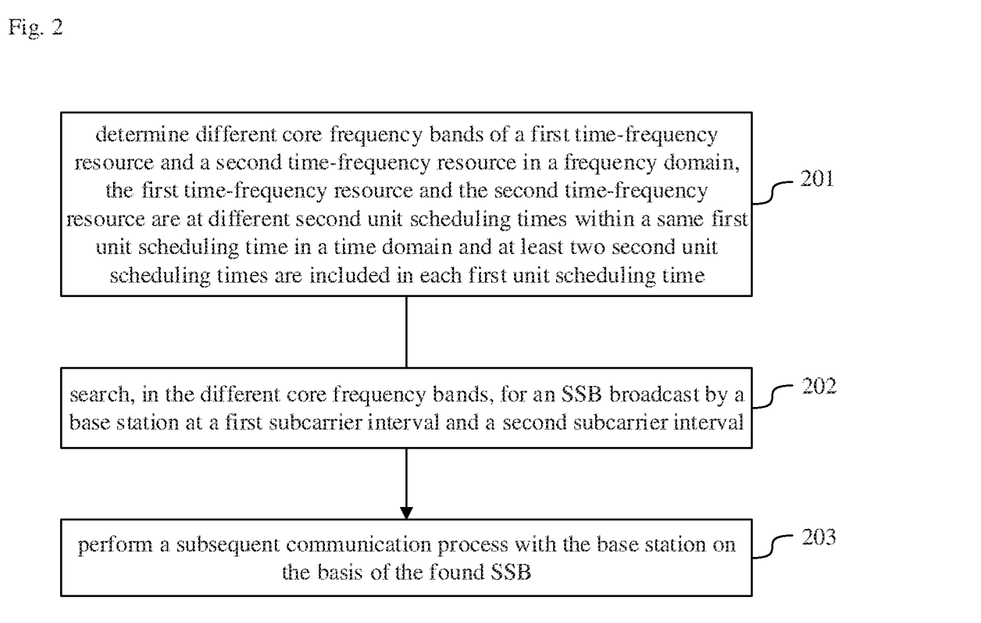
FIG. 2 is a flow chart of a communication method, according to exemplary embodiments.

FIG. 2 is a flow chart of a communication method according to an exemplary embodiment. As shown in FIG. 2, the method may include the following steps.

In Step 201, different core frequency bands of a first time-frequency resource and a second time-frequency resource in a frequency domain are determined. The first time-frequency resource and the second time-frequency resource are at different second unit scheduling times in the same first unit scheduling time in a time domain, and at least two second unit scheduling times are included in each first unit scheduling time.

In Step 202, in the different core frequency bands, an information block, such as an MIB or an SSB, broadcast by a base station is searched for at a first subcarrier interval and a second subcarrier interval.

For illustrative purposes only, it is assumed that the information block in the embodiment is an MIB. While the embodiment has been described based on the MIB, the method is not so limited. It may be practiced with equal effectiveness with other information blocks such as an SSB.

In Step 203, a subsequent communication process with the base station is performed on the basis of the found MIB.

In embodiments of the present disclosure, since the base station broadcasts the MIB on the first time-frequency resource and the second time-frequency resource, and the first time-frequency resource and the second time-frequency resource have different subcarrier intervals in the frequency domain, reliable low-delay UE may find the MIB at a first subcarrier interval, or may find the MIB at a second subcarrier interval; since the first time-frequency resource and the second time-frequency resource are at different second unit scheduling times within the same first unit scheduling time in the time domain, the UE may find the MIB within less than a first unit scheduling time; and therefore, the delay of access of the UE to the base station may be reduced, and the requirement of the UE on rapid access to the base station may be met.

In an embodiment, the step 202 that in the different core frequency bands, the MIB broadcast by the base station is searched for at the first subcarrier interval and the second subcarrier interval includes that when the searching in the different core frequency bands results that the MIB is found at the first subcarrier interval, the first time-frequency resource is determined; the second time-frequency resource is determined on the basis of a specified relationship between the first time-frequency resource and the second time-frequency resource in the time domain; the MIB broadcast by the base station is searched for on the second time-frequency resource at the second subcarrier interval; or when the searching in the different core frequency bands results that the MIB is found at the second subcarrier interval, the second time-frequency resource is determined; the first time-frequency resource is determined on the basis of the specified relationship; and the MIB broadcast by the base station is searched for on the first time-frequency resource at the first subcarrier interval.

In an embodiment, before the step 202 that in the different core frequency bands, the MIB broadcast by the base station is searched for at the first subcarrier interval and the second subcarrier interval, the method further includes that: in a communication frequency band of the UE, synchronization information broadcast by the base station is searched for at the first subcarrier interval and the second subcarrier interval, the synchronization information being used to indicate different core frequency bands of the base station; the step 201 that the different core frequency bands of the first time-frequency resource and the second time-frequency resource in the frequency domain are determined may include that: the core frequency hand of the first time-frequency resource in the frequency domain is determined on the basis of the synchronization information found at the first subcarrier interval; and the core frequency band of the second time-frequency resource in the frequency domain is determined on the basis of the synchronization information found at the second subcarrier interval.

All of the above technical solutions may be freely combined to form additional embodiments of the present disclosure, which will not be elaborated one by one herein.

In the above embodiments shown in FIG. 1 and FIG. 2, the first unit scheduling time refers to a divided period of time in the time domain, and continuously exists in the time domain. The first unit scheduling time includes at least two second unit scheduling times, and the second unit scheduling times continuously exist within the first unit scheduling time, and therefore, the second unit scheduling time is a subordinate unit scheduling time of the first unit scheduling time. The core frequency bands are used to bear the MIB and synchronization information broadcast by the base station.

The present disclosure does not make any specific limit to the first unit scheduling time, the second unit scheduling time and the different core frequency bands of the first time-frequency resource and the second time-frequency resource in the frequency domain.

Figure 3:
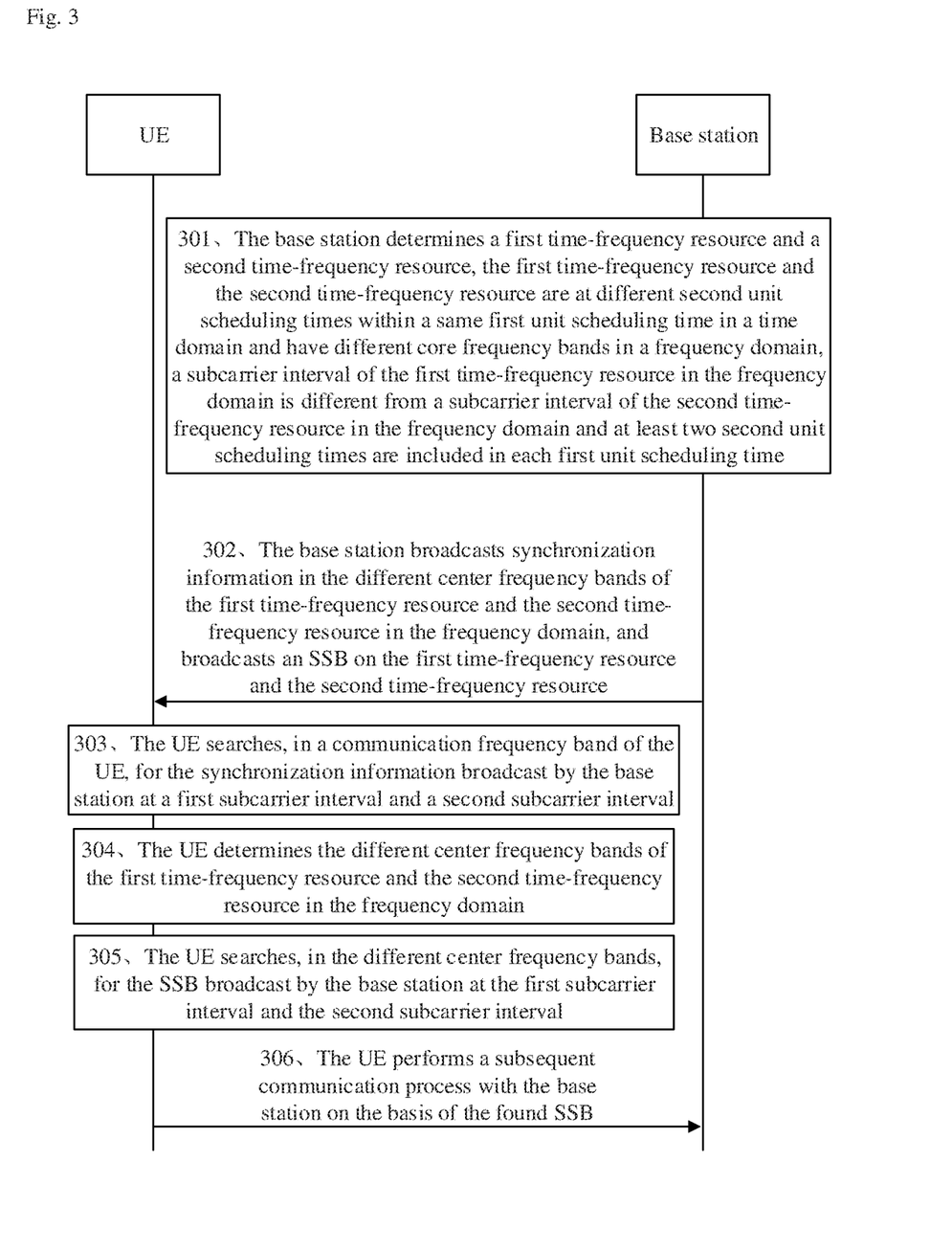
FIG. 3 is a flow chart of a communication method, according to exemplary embodiments.

FIG. 3 is a flow chart of a communication method according to exemplary embodiments. As shown in FIG. 3, an interaction process between a base station and UE is described by taking a frame as a first unit scheduling time, a sub-frame as a second unit scheduling time and a center frequency band as a core frequency band as an example in the embodiment. The method includes the following steps.

In Step 301, the base station determines a first time-frequency resource and a second time-frequency resource. The first time-frequency resource and the second time-frequency resource are different sub-frames within a same frame in a time domain and have different center frequency bands in a frequency domain, and a subcarrier interval of the first time-frequency resource in the frequency domain is different from a subcarrier interval of the second time-frequency resource in the frequency domain.

In embodiments of the present disclosure, besides providing the communication service for the UE in the existing original wireless broadband access service, the base station may provide the communication service for UE in the reliable and low-delay service for the 5G mobile communication technology. In view of different requirements of the UE in the two services, a base station side may provide different communication manners.

Therefore, in the step 301, the base station determines the first time-frequency resource and the second time-frequency resource within available time-frequency resources to further distinguish time-frequency resources for the UE in the two services. For example, available time-frequency resources of a base station may be configured by an operator. The center frequency band refers to a frequency range positioned in middle within an available frequency range of the UE in the service. A subcarrier interval refers to a peak interval of two subcarriers bearing information, and subcarrier intervals in the same center frequency band are the same. The present disclosure does not make any limit to the sub-frame of the first time-frequency resource and the second time-frequency resource in the time domain, the center frequency band in the frequency domain and the subcarrier interval in the frequency domain.

Figure 4:
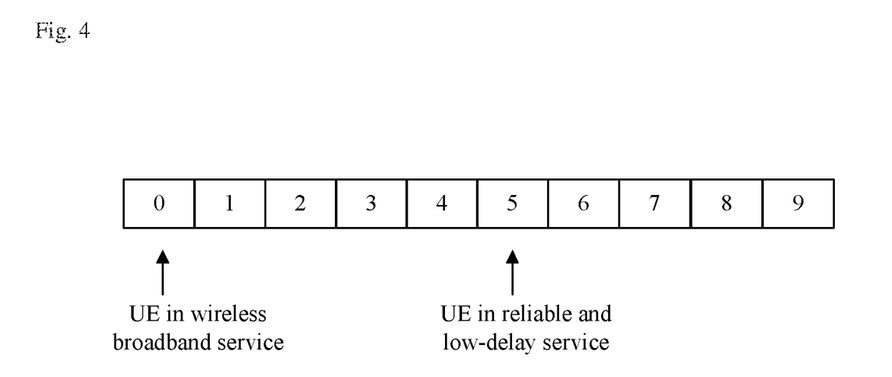
FIG. 4 is a schematic diagram illustrating a time-domain resource, according to exemplary embodiments.

FIG. 4 is a schematic diagram illustrating a time-domain resource, according to exemplary embodiments. As shown in FIG. 4, the interval of the first time-frequency resource and the second time-frequency resource in the time domain includes 4 sub-frames; the UE in the existing wireless broadband service adopts the first time-frequency resource of which the sub-frame in the time domain is sub-frame 0, and the UE in the new reliable and low-delay service adopts the second time-frequency resource of which the sub-frame in the time domain is sub-frame 5.

Figure 5:
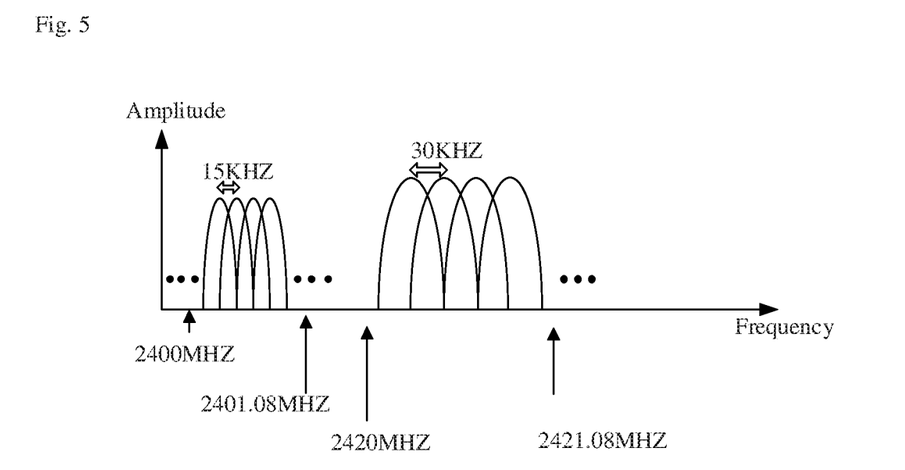
FIG. 5 is a schematic diagram illustrating a frequency-domain resource, according to exemplary embodiments.

FIG. 5 is a schematic diagram illustrating a frequency-domain resource, according to exemplary embodiments. As shown in FIG. 5, the center frequency band of the first time-frequency resource in the frequency domain is 2,400 MHZ~2,401.08 MHZ, the center frequency band of the second time-frequency resource in the frequency domain is 2,420 MHZ~2,421.08 MHZ, the subcarrier interval of the first time-frequency resource in the frequency domain is 15 KHZ, and the subcarrier interval of the second time-frequency resource in the frequency domain is 60 KHZ or 30 KHZ. At this time, the center frequency band of the first time-frequency resource in the frequency domain corresponds to 72 subcarriers, and the center frequency band of the second time-frequency resource in the frequency domain corresponds to 18 subcarriers.

In Step 302, the base station broadcasts synchronization information in the different center frequency bands of the first time-frequency resource and the second time-frequency resource in the frequency domain, and broadcasts an information block, such as an MIB or an SSB, on the first time-frequency resource and the second time-frequency resource.

For illustrative purposes only, it is assumed that the information block in the embodiment is an MIB. While the embodiment has been described based on the MIB, the method is not so limited. It may be practiced with equal effectiveness with other information blocks such as an SSB.

Here, the synchronization information includes primary synchronization information and secondary synchronization information for indicating a descrambling scheme for the MIB. For example, in the schematic diagram illustrating the time-domain resource shown in FIG. 4, the primary synchronization information is arranged in sub-frame 1 and sub-frame 6, and is used to indicate a time period of a half frame, and the secondary synchronization information is arranged in sub-frame 0 and sub-frame 5, and is used to indicate a time period of a frame. Therefore, when successfully acquiring the primary synchronization information and the secondary synchronization information, the UE may determine a broadcast period of the base station and acquire a cell identifier corresponding to the base station, to descramble the scrambled MIB on the basis of the cell identifier.

The MIB includes basic configuration information of the base station, such as a system bandwidth, a system frame number and an antenna number. Therefore, after successfully acquiring the MIB of the base station, the UE may access the base station to communicate with the base station on the basis of an indication of the MIB. Generally, the MIB is arranged in sub-frame 0, that is, the base station repeatedly broadcasts the same MIB every 10 milliseconds (a frame).

On the basis of Step 301, the base station determines the time-frequency resources for the MIB to be broadcast, and determines the time-frequency resources for the synchronization information to be broadcast: in the time domain, descriptions about the abovementioned synchronization information are applied; and in the frequency domain, the same synchronization information is broadcast in the two center frequency bands for the MIB.

In Step 303, the UE searches for the synchronization formation broadcast by the base station at a first subcarrier interval and a second subcarrier interval in a communication frequency band.

In the step 303, since the operator has pre-configured a searching interval and the communication frequency hand in the UE, the UE may autonomously search for the synchronization information in the communication frequency band at the searching interval once being started. Here, the searching interval refers to a frequency at which the UE searches for the synchronization information and the MIB; and the communication frequency band refers to a frequency band supported by the UE, and the frequency band supported by the UE may include the center frequency bands of the first time-frequency resource and the second time-frequency resource in the frequency domain. Descriptions will be made below with different searching processes corresponding to the UE in the two services as examples.

1: The searching process for the UE in the reliable and low-delay service: the searching interval pre-configured for the UE corresponds to two subcarrier intervals, for example, 15 KHZ and 60 KHZ (or 30 KHZ). Therefore, the UE may search for the synchronization information in the communication frequency band at the first subcarrier interval and the second subcarrier interval, thereby being able to find the synchronization information in the center frequency bands of the first time-frequency resource and the second time-frequency resource in the frequency domain. Since a synchronization signal bearing the synchronization information is usually a Zadoff-Chu sequence which has a fixed amplitude, the UE may easily identify the synchronization signal by virtue of such a feature. Moreover, the synchronization signal is unscrambled codes, so that the UE may directly demodulate the synchronization information after acquiring the synchronization signal.

2: The searching process for the UE in the wireless broadband access service: the searching interval pre-configured for the UE corresponds to a subcarrier interval, for example, 15 KHZ. Therefore, the UE may search for the synchronization information in the communication frequency band just at the subcarrier interval of 15 KHZ. At this time, since the synchronization information corresponds to two different subcarrier intervals, when the UE searches for the synchronization information at one subcarrier interval, the synchronization information corresponding to the other subcarrier interval is signal noise for the former, the UE may just find the synchronization information in the center frequency band of the first time-frequency resource or the second time-frequency resource in the frequency domain, and the UE may identify the synchronization signal in a same manner as described in the previous paragraph.

Widths of the center frequency bands are also pre-configured in the UE, so that the UE may determine specific positions of the center frequency bands in the frequency domain on the basis of a frequency at which the synchronization information is found after finding the synchronization information. The center frequency band is a representation form of core frequency band. The core frequency band may take another representation form. For example, the system bandwidth of the base station is divided into three frequency bands, and the abovementioned two core frequency bands are in the middle of two frequency bands respectively.

For example, if the system bandwidth is (2,700M,2,760M], the three divided frequency bands are frequency band 1: (2,700M,2,720M], frequency band 2: (2,720M,2,740M] and frequency band 3: (2,740M,2,760M], respectively. Further, the abovementioned two core frequency bands may be 2,709.46M~2,710.54M and 2,729.46M~2,730.54M.

In Step 304, the UE determines the different center frequency bands of the first time-frequency resource and the second time-frequency resource in the frequency domain.

On the basis of Step 303, the UE may not only search for the synchronization information at the first subcarrier interval, but also search for the synchronization information at the second subcarrier interval. When finding the synchronization information at either subcarrier interval, the UE may further search for the MIB on the basis of the synchronization information. Since the synchronization information and the corresponding MIB adopt the same center frequency band, the UE may determine the center frequency band for the synchronization information when finding the synchronization information, which also determines the center frequency band for the MIB. Equivalently, the different center frequency bands of the first time-frequency resource and the second time-frequency resource in the frequency domain are determined when the center frequency hand for the MIB is determined.

Alternatively or additionally, the core frequency band may he expressed in another manner. For example, in the core frequency band illustrated in Step 303, since both the synchronization information and the MIB are born in the core frequency band, once the UE finds the synchronization information, the UE may determine the core frequency band as described in the present step, to further pertinently search for the MIB in the center frequency band.

For example, the abovementioned determination process may be as follows: the UE determines the center frequency hand of the first time-frequency resource in the frequency domain on the basis of the synchronization information found at the first subcarrier interval; and the UE determines the center frequency band of the second time-frequency resource in the frequency domain on the basis of the synchronization information found at the second subcarrier interval.

In an embodiment, when the first subcarrier interval is 15 KHZ, once finding the synchronization information at 15 KHZ, the UE may determine that the MIB with the subcarrier interval of 15 KHZ is also arranged in the center frequency band in which the synchronization information is arranged, thereby determining the center frequency band of the first time-frequency resource in the frequency domain.

In an embodiment when the first subcarrier interval is 60 KHZ, once finding the synchronization information at 60 KHZ, the UE may determine that the MIB with the subcarrier interval of 60 KHZ is also arranged in the center frequency band in which the synchronization information is arranged, thereby determining the center frequency band of the second time-frequency resource in the frequency domain.

In addition, if the UE searches for the synchronization information at just one subcarrier interval, for example, the UE in the wireless broadband access service is configured with just one subcarrier interval, the UE may just determine the center frequency band corresponding to the subcarrier interval.

In Step 305, the UE searches for the MIB broadcast by the base station at the first subcarrier interval and the second subcarrier interval in the different center frequency bands.

As illustrated above, the UE determines the two different center frequency bands for the MIB with the same content in step 304. Therefore, in step 305, the UE may directly search for the MIB in the two center frequency bands. When the UE finds a subcarrier, the UE may demodulate the subcarrier. After being demodulated, the demodulated sub-carrier may be descrambled according to the cell identifier acquired in Step 302. Accordingly, the descrambled information is determined to be the MIB.

For example, in the schematic diagram illustrating the time-domain resource shown in FIG. 4, if the MIB is broadcast by the method in the related art, the UE may need 10 milliseconds to find the MIB. In embodiments of the present disclosure, the base station broadcasts the MIB on different time-frequency resources, so that a broadcast time interval of the MIB is relatively shorter, for example, 4 milliseconds. In this way, when the UE performs searching both at the first subcarrier interval and at the second subcarrier interval, the UE may need at most 5 milliseconds to find the MIB at either subcarrier interval and MIB searching time of the UE is greatly reduced. Therefore, time: for the UE to access the base station is reduced, and the requirement of the UE in the reliable low-delay service on the delay is met.

Because the acquired MIB may be incomplete and the UE may need to search for the MIB again, the MIB may be continuously searched for in the following manner to further improve searching efficiency.

The UE determines the first time-frequency resource when finding the MIB at the first subcarrier interval, determines the second time-frequency resource on the basis of a specified relationship between the first time-frequency resource and the second time-frequency resource in the time domain, and searches for the MIB broadcast by the base station on the second time-frequency resource at the second subcarrier interval. Or, if the UE finds the MIB at the second subcarrier interval in a different frequency band, the UE determines the second time-frequency resource, determines the first time-frequency resource on the basis of the specified relationship, and searches for the MIB broadcast by the base station on the first time-frequency resource at the first subcarrier interval.

Here, the specified relationship is configured to indicate an interval between the different second unit scheduling times for the MIB in the time domain. The specified relationship in the embodiment of the present disclosure is configured to indicate an interval between the different sub-frames for the MIB in the time domain. It is to be noted that the specified relationship may be pre-configured in the UE in the reliable low-delay service.

For example, if the UE in the reliable low-delay service finds the MIB at the first subcarrier interval, the UE may determine a time-domain resource (for example, a sub-frame number is 0), i.e., a sub-frame number of the first time-frequency resource in the time domain, for the MIB, once finding the MIB at the first subcarrier interval, thereby determining a time-frequency resource for the MIB, and at this time, the UE may determine another time-domain resource (for example, a sub-frame number is 5), i.e., a sub-frame number of the second time-frequency resource in the time domain, for the MIB, on the basis of the specified relationship (the interval between the different sub-frames in the time domain is 4 sub-frames), thereby determining the second time-frequency resource. Furthermore, the UE may pertinently search for the MIB on the second time-frequency resource at the second subcarrier interval.

In Step 306, the UE performs a subsequent communication process with the base station on the basis of the found MIB.

On the basis of Step 305, the UE may perform the subsequent communication process with the base station according to the configuration information, indicated by the MIB, of the base station.

To improve accuracy and completeness of the found MIB, the UE may check the found MIB, which is not limited in the embodiments of the present disclosure. For example, the UE checks found MIB information in a cyclic redundancy check (CRC) manner, and if a check result indicates correctness, the UE determines that found MIB information is accurate and complete, thereby communicating with the base station on the basis of the MIB; and if the check result indicates an error, the UE determines that the found MIB information is incomplete, and searches for the MIB at the first subcarrier interval and the second subcarrier interval again.

For the abovementioned condition of searching for the MIB again, since the UE has acquired the length of a frame and the center frequency bands in which the MIB is arranged, the UE may determine the two sub-frame numbers in which the MIB is arranged after Step 305, and when the MIB is searched for at a certain subcarrier interval again, the MIB may be directly searched for within the sub-frame numbers and the center frequency bands. Therefore, searching pertinence of the UE is higher, and no searching time is wasted.

In addition, in order to further improve MIB searching efficiency, the UE may combine the MIB found on the first time-frequency resource and the MIB found on the second time-frequency resource to obtain a complete MIB, and communicate with the base station on the basis of the complete MIB. In such a manner, the UE fully utilizes found MIB resources, and if MIBs are checked to be incomplete, the UE may perform searching again and combine the found MIBs to obtain a complete MIB. The combination manner is not limited in the embodiments of the present disclosure. For example, the UE retains the same part of two MIBs on information bits, and replaces different part of the original MIB on the information bits with the latest MIB.

In embodiments of the present disclosure, since the base station broadcasts the MIB on the first time-frequency resource and the second time-frequency resource, and the first time-frequency resource and the second time-frequency resource have different subcarrier intervals in the frequency domain, reliable low-delay UE may find the MIB at a first subcarrier interval, or may find the MIB at a second subcarrier interval; since the first time-frequency resource and the second time-frequency resource are at different second unit scheduling times in the same first unit scheduling time in the time domain, the UE may find the MIB within less than a first unit scheduling time; and therefore, the delay of access of the UE to the base station may be reduced, and the requirement of the UE on rapid access to the base station may be met.

In addition, since the MIB with the same content corresponds to different subcarrier intervals, when searching for the MIB at one subcarrier interval, the UE in the wireless broadband access service may not find the MIB corresponding to the other subcarrier interval, the base station provides different communication manners according to different requirements of the two services on the delay, and there is no interference between the UEs in the two services respectively.

Figure 6:
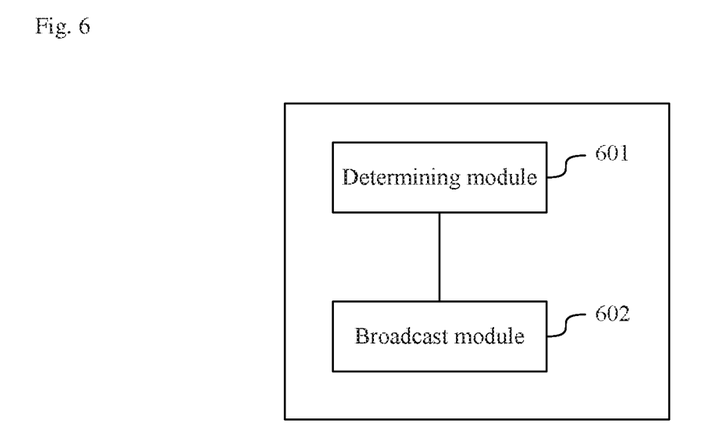
FIG. 6 is a block diagram of a communication device, according to exemplary embodiments.

FIG. 6 is a block diagram of a communication device, according to exemplary embodiments. Referring to FIG. 6, the device includes a determining module 601 and a broadcast module 602.

The determining module 601 is configured to determine a first time-frequency resource and a second tune-frequency resource. The first time-frequency resource and the second time-frequency resource are at different second unit scheduling times within a same first unit scheduling time in a time domain and have different core frequency hands in a frequency domain, and a subcarrier interval of the first time-frequency resource in the frequency domain is different from a subcarrier interval of the second time-frequency resource in the frequency domain, where at least two second unit scheduling times are included in each first unit scheduling time.

The broadcast module 602 is configured to broadcast an information block, such as an MIB or an SSB, on the first time-frequency resource and the second time-frequency resource.

For illustrative purposes only, it is assumed that the information block in the embodiment is an MIB. While the embodiment has been described based on the MIB, the operation of the device is not so limited. It may be practiced with equal effectiveness with other information blocks such as an SSB.

In an embodiment, since the base station broadcasts the MIB on the first time-frequency resource and the second time-frequency resource, and the first time-frequency resource and the second time-frequency resource have different subcarrier intervals in the frequency domain, reliable low-delay UE may find the MIB at a first subcarrier interval, or may find the MIB at a second subcarrier interval; since the first time-frequency resource and the second time-frequency resource are at different second unit scheduling times within the same first unit scheduling time in the time domain, the UE may find the MIB within less than a first unit scheduling time; and therefore, the delay of access of the UE to the base station may be reduced, and the requirement of the UE on rapid access to die base station may be met.

In an embodiment, a difference between the first time-frequency resource and the second time-frequency resource in the time domain is a half of the first unit scheduling time.

In an embodiment, the subcarrier interval of the first time-frequency resource in the frequency domain is 15 KHZ, and the subcarrier interval of the second time-frequency resource in the frequency domain is 60 KHZ or 30 KHZ.

All of the above technical solutions may be freely combined to form additional embodiments of the present disclosure, which will not be elaborated one by one herein.

Figure 7:
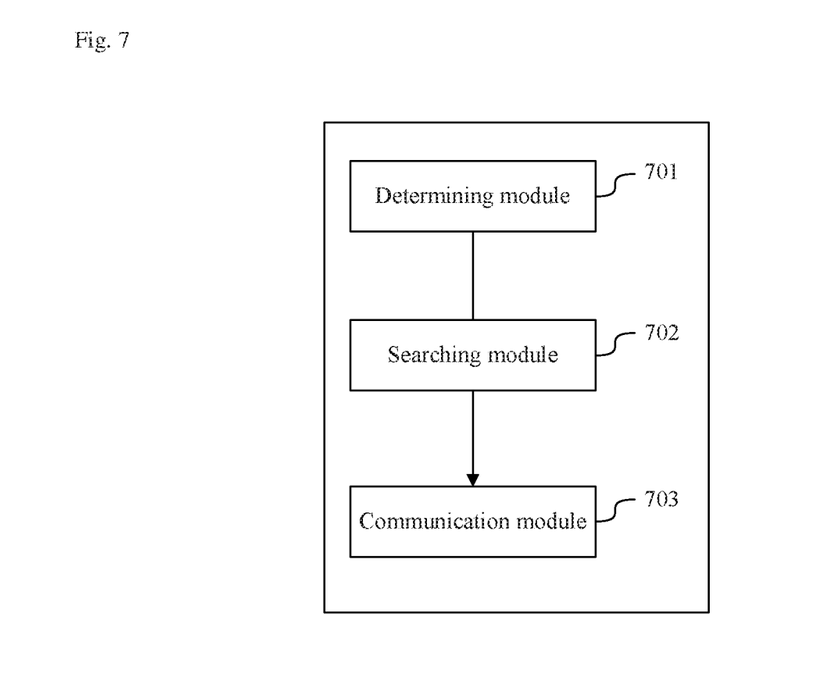
FIG. 7 is a block diagram of a communication device, according to exemplary embodiments.

FIG. 7 is a block diagram of a communication device, according to exemplary embodiments. Referring to FIG. 7, the device includes a determining module 701, a searching module 702, and a communication module 703.

The determining module 701 is configured to determine different core frequency bands of a first time-frequency resource and a second time-frequency resource in a frequency domain. The first time-frequency resource and the second time-frequency resource are at different second unit scheduling times within the same first unit scheduling time in a time domain, and at least two second unit scheduling times are included in each first unit scheduling time.

The searching module 702 is configured to search, in the different core frequency bands, for an information block, such as an MIB or an SSB, cast by a base station at a first subcarrier interval and a second subcarrier interval.

For illustrative purposes only, it is assumed that the information block in the embodiment is an MIB. While the embodiment has been described based on the MIB, the operation of the device is not so limited. It may be practiced with equal effectiveness with other information blocks such as an SSB.

The communication module 703 is configured to perform a subsequent communication process with the base station on the basis of the found MIB.

In embodiments of the present disclosure, since the base station broadcasts the MIB on the first time-frequency resource and the second time-frequency resource, and the first time-frequency resource and the second time-frequency resource have different subcarrier intervals in the frequency domain, reliable low-delay UE may find the MIB at a first subcarrier interval, or may find the MIB at a second subcarrier interval; since the first time-frequency resource and the second time-frequency resource are at different second unit scheduling times within the same first unit scheduling time in the time domain, the UE may find the MIB within less than a first unit scheduling time; and therefore, the delay of access of the UE to the base station may be reduced, and the requirement of the UE on rapid access to the base station may be met.

In an embodiment, the searching module 702 is configured to: if the search in the different core frequency bands results that the MIB is found at the first subcarrier interval, determine the first time-frequency resource, determine the core frequency band of the first time-frequency resource in the frequency domain on the basis of synchronization information found at the first subcarrier interval, determine the second time-frequency resource on the basis of a specified relationship between the first time-frequency resource and the second time-frequency resource in the time domain, and search for the MIB broadcast by the base station on the second time-frequency resource at the second subcarrier interval.

In an embodiment, the searching module 702 is configured to: if the search in the different core frequency bands results that the MIB is found at the second subcarrier interval, determine the second time-frequency resource, determine the first time-frequency resource on the basis of the specified relationship, and search for the MIB broadcast by the base station on the first time-frequency resource at the first subcarrier interval.

In an embodiment, the searching module 702 is further configured to: search for synchronization information broadcast by the base station at the first subcarrier interval and the second subcarrier interval in a communication frequency band of UE, the synchronization information being used to indicate different core frequency bands of the base station; and the determining module 701 is configured to determine the core frequency band of the first time-frequency resource in the frequency domain on the basis of the synchronization information found at the first subcarrier interval, and determine the core frequency band of the second time-frequency resource in the frequency domain on the basis of the synchronization information found at the second subcarrier interval.

All of the above technical solutions may be freely combined to form additional embodiments of the present disclosure, which will not be elaborated one by one herein.

It is to be noted that the communication device provided by the embodiments is described based on functional modules as an example, and during a practical application, the above functions may be allocated to different function modules for realization according to a requirement, that is, an internal structure of the device is divided into different function modules to realize all or part of the abovementioned functions.

Figure 8:
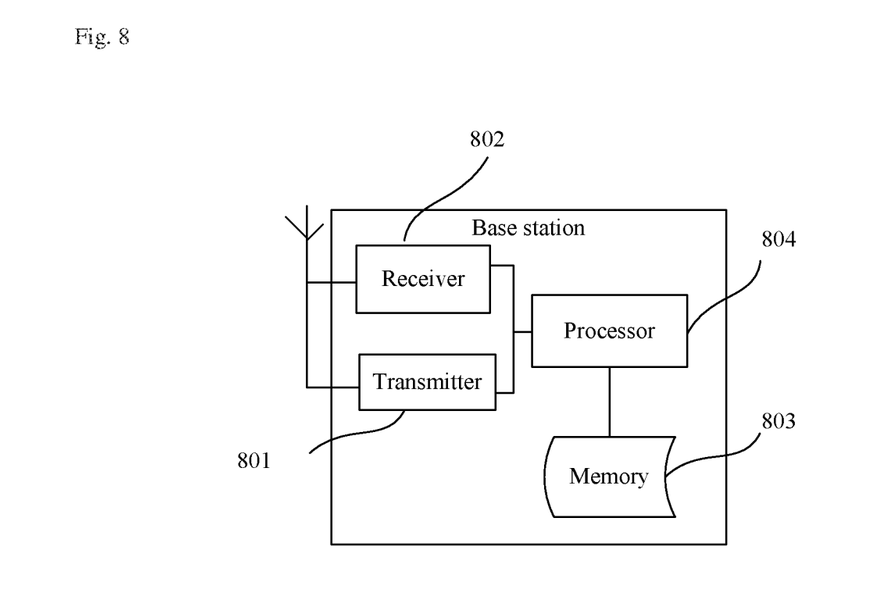
FIG. 8 is a schematic diagram of a base station, according to exemplary embodiments.

FIG. 8 is a schematic diagram of a base station, according to exemplary embodiments. As shown in FIG. 8, the base station includes a transmitter 801, a receiver 802, a memory 803 and a processor 804 connected with the transmitter 801, the receiver 802, and the memory 803, respectively. The base station may also include a universal part such as an antenna, a baseband processing part, an intermediate-radio frequency processing part and an Input/Output (I/O) device, which is not limited in the embodiments of the present disclosure. The processor 804 is configured to execute instructions on a base station side to perform the above-described methods.

Figure 9:
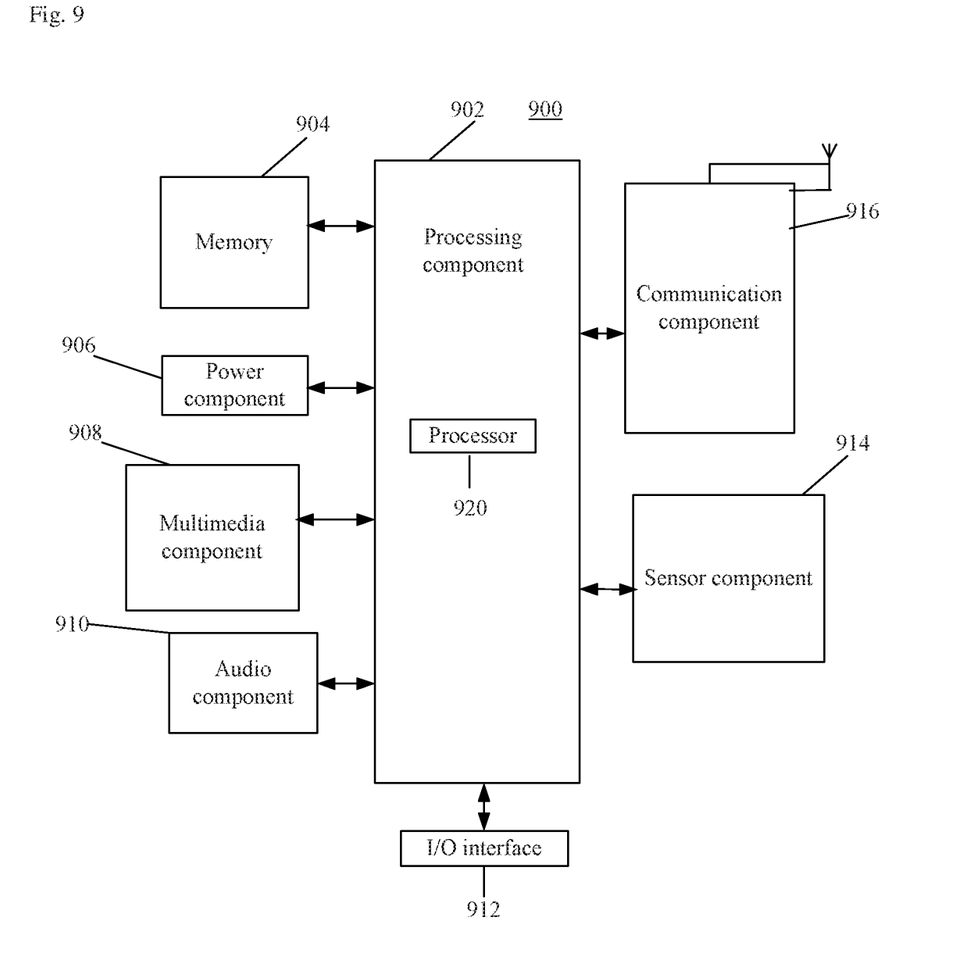
FIG. 9 is a block diagram of a communication device, according to exemplary embodiments.

FIG. 9 is a block diagram of a communication device 900, according to exemplary embodiments. For example, the device 900 may be UE, a mobile phone, a computer, a digital broadcast terminal, a messaging device, a gaming console, a tablet, a medical device, exercise equipment and a personal digital assistant.

Referring to FIG. 9, the device 900 may include one or more of the following components: a processing component 902, a memory 904, a power component 906, a multimedia component 908, an audio component 910, an I/O interface 912, a sensor component 914, and a communication component 916.

The processing component 902 typically controls overall operations of the device 900, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate interaction between the processing component 902 and the other components. For instance, the processing component 902 may include a multimedia module to facilitate interaction between the multimedia component 908 and the processing component 902.

The memory 904 is configured to store various types of data to support the operation of the device 900. Examples of such data include instructions for any application programs or methods operated on the device 900, contact data, phonebook data, messages, pictures, video, etc. The memory 904 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 906 provides power for various components of the device 900. The power component 906 may include a power management system, one or more power supplies, and other components associated with the generation, management and distribution of power for the device 900.

The multimedia component 908 includes a screen providing an output interface between the device 900 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 908 includes a front camera and/or a rear camera. The front camera and/or the rear camera may receive external multimedia data when the device 900 is in an operation mode, such as a photographing mode; or a video mode. Each of the front camera and the rear camera may he a fixed optical lens system or have focusing and optical zooming capabilities.

The audio component 910 is configured to output and/or input an audio signal. For example, the audio component 910 includes a Microphone (MIC), and the MIC is configured to receive an external audio signal when the device 900 is in the operation mode, such as a call mode, a recording mode and a voice recognition mode. The received audio signal may be further stored in the memory 904 or sent through the communication component 916. In some embodiments, the audio component 910 further includes a speaker configured to output the audio signal.

The I/O interface 912 provides an interface between the processing component 902 and a peripheral interface module, and the peripheral interface module may be a keyboard, a click wheel, a button and the like. The button may include, but not limited to: a home button, a volume button, a starting button and a locking button.

The sensor component 914 includes one or more sensors configured to provide status assessment in various aspects for the device 900. For instance, the sensor component 914 may detect on/off status of the device 900 and relative positioning of components, such as a display and small keyboard of the device 900, and the sensor component 914 may further detect a change in a position of the device 900 or a component of the device 900, presence or absence of contact between the user and the device 900, orientation or acceleration/deceleration of the device 900 and a change in temperature of the device 900. The sensor component 914 may include a proximity sensor configured to detect presence of an object nearby without any physical contact. The sensor component 914 may also include a light sensor, such as a Complementary Metal Oxide Semiconductor (CMOS) or Charge Coupled Device (CCD) image sensor, configured for use in an imaging application. In some embodiments, the sensor component 914 may also include an acceleration sensor, a gyroscope sensor, a magnetic sensor, a pressure sensor or a temperature sensor.

The communication component 916 is configured to facilitate wired or wireless communication between the device 900 and another device. The device 900 may access a communication-standard-based wireless network, such as a Wireless Fidelity (Wi-Fi) network, a 2nd-Generation (2G) or 3rd-Generation (3G) network or a combination thereof. In an exemplary embodiment, the communication component 916 receives a broadcast signal or broadcast associated information from an external broadcast management system through a broadcast channel. In an exemplary embodiment, the communication component 916 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BlueTooth (BT) technology and another technology.

In an exemplary embodiment, the device 900 may be implemented by one or more circuitries, which include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above disclosed communication method. The device 900 may use the circuitries in combination with the other hardware or software components for performing the above described methods. Each module, sub-module, unit, or sub-unit in the disclosure may be implemented at least partially using the one or more circuitries.

In an exemplary embodiment, there is also provided a non-transitory computer-readable storage medium including an instruction, such as the memory 904 including an instruction, and the instruction may be executed by the processor 920 of the device 900 to implement the above described methods. For example, the non-transitory computer-readable storage medium may be a ROM, a Radom Access Memory (RAM), a Compact Disc Read-Only Memory (CD-ROM), a magnetic tape, a floppy disc, an optical data storage device and the like.

Those skilled in the art should know that all or part of the steps of the above described methods may be implemented by hardware, and may also be implemented by instructing related hardware by a program, the program may be stored in a computer-readable storage medium, and the abovementioned storage medium may be a ROM, a magnetic disk, an optical disk or the like.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also he termed as first information. As used herein, the term if may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the present disclosure will he apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

What is claimed is:

1. A communication method, comprising:
   determining, by a base station, a first time-frequency resource and a second time-frequency resource, wherein the first time-frequency resource and the second time-frequency resource are at different second unit scheduling times within a same first unit scheduling time in a time domain and have different core frequency bands in a frequency domain, the first time-frequency resource has a first subcarrier interval in the frequency domain, the second time-frequency resource has a second subcarrier interval that is different from the first subcarrier interval in the frequency domain, and at least two second unit scheduling times are included in each first unit scheduling time; and broadcasting, by the base station, an information block on the first time-frequency resource and on the second time-frequency resource.

2. The method according to claim 1, wherein the information block is one of a master information block (MIB) or a synchronization signal block (SSB).

3. The method according to claim 1, wherein a difference between the first time-frequency resource and the second time-frequency resource in the time domain is a half of the first unit scheduling time.

4. The method according to claim 1, wherein the subcarrier interval of the first time-frequency resource in the frequency domain is 15 KHZ, and the subcarrier interval of the second time-frequency resource in the frequency domain is 30 KHZ.

5. A communication method, comprising:
determining, by user equipment (UE), different core frequency bands of a first time-frequency resource and a second tune-frequency resource in a frequency domain, wherein the first time-frequency resource and the second time-frequency resource are at different second unit scheduling times within a same first unit scheduling time in a time domain and at least two second unit scheduling times are included in each first unit scheduling time;
searching, by the UE, in the different core frequency bands, for an information block broadcast by a base station at a first subcarrier interval and a second subcarrier interval; and
performing, by the UE, a subsequent communication process with the base station on the basis of the information block.

6. The method according to claim 5, wherein the information block is one of a master information block (MIB) or a synchronization signal block (SSB).

7. The method according to claim 5, wherein searching, by the UE, in the different core frequency bands, for the information block broadcast by the base station at a first subcarrier interval and a second subcarrier interval comprises one of:
when the searching in the different core frequency bands results that the information block is found at the first subcarrier interval, determining the first time-frequency resource, determining, by the UE, the second time-frequency resource on the basis of a specified relationship between the first time-frequency resource and the second time-frequency resource in the time domain, and searching for the information block broadcast by the base station on the second time-frequency resource at the second subcarrier interval; and
when the searching in the different core frequency bands results that the information block is found at the second subcarrier interval, determining the second time-frequency resource, determining, by the UE, the first time-frequency resource on the basis of the specified relationship, and searching for the information block broadcast by the base station on the first time-frequency resource at the first subcarrier interval.

8. The method according to claim 5, before searching, by the UE, in the different core frequency bands, for the information block broadcast by a base station at the first subcarrier interval and the second subcarrier interval, further comprising:
searching, by the UE, in a communication frequency band of the UE, for synchronization information broadcast by the base station at e first subcarrier interval and the second subcarrier interval, wherein the synchronization information is used to indicate different core frequency bands of the base station, and
wherein determining, by the UE, different core frequency bands of a first time-frequency resource and a second time-frequency resource in the frequency domain comprises:
determining, by the UE, the core frequency band of the first time-frequency resource in the frequency domain on the basis of the synchronization information found at the first subcarrier interval; and
determining, by the UE, the core frequency band of the second time-frequency resource in the frequency domain on the basis of the synchronization information found at the second subcarrier interval.

9. A communication device, comprising:
a processor; and
a memory configured to store an instruction executable for the processor,
wherein the processor is configured to:
determine a first time-frequency resource and a second time-frequency resource, wherein the first time-frequency resource and the second time-frequency resource are at different second unit scheduling times within a same first unit scheduling time in a time domain and have different core frequency bands in a frequency domain, the first time-frequency resource has a first subcarrier interval in the frequency domain, the second time-frequency resource has a second subcarrier interval that is different from the first subcarrier interval in the frequency domain, and at least two second unit scheduling times are included in each first unit scheduling time; and
broadcast an information block on the first time-frequency resource and the second time-frequency resource.

10. The communication device according to claim 9, wherein the information block is one of a master information block (MIB) or a synchronization signal block (SSB).

11. The communication device according to claim 9, wherein a difference between the first time-frequency resource and the second time-frequency resource in the time domain is a half of the first unit scheduling time.

12. The communication device according to claim 9, wherein the subcarrier interval of the first time-frequency resource in the frequency domain is 15 KHZ, and the subcarrier interval of the second time-frequency resource in the frequency domain is 30 KHZ.

13. A communication device, comprising:
a processor; and
a memory configured to store an instruction executable for the processor,
wherein the processor is configured to:
determine different core frequency bands of a first time-frequency resource and a second time-frequency resource in a frequency domain, wherein the first time-frequency resource and the second time-frequency resource are at different second unit scheduling times within a same first unit scheduling time in a time domain and at least two second unit scheduling times are included in each first unit scheduling time;

search, in the different core frequency bands, for an information block broadcast by a base station at a first subcarrier interval and a second subcarrier interval; and perform a subsequent communication process with the base station on the basis of the information block.

14. The communication device according to claim 13, wherein the information block is one of a master information block (MIB) or a synchronization signal block (SSB).

15. The communication device according to claim 13, wherein in searching, in the different core frequency bands, for the information block broadcast by the base station at the first subcarrier interval and the second subcarrier interval, the processor is further configured to:

when the searching in the different core frequency bands results that the information block is found at the first subcarrier interval, determine the first time-frequency resource, determine the second time-frequency resource on the basis of a specified relationship between the first time-frequency resource and the second time-frequency resource in the time domain, and search for the information block broadcast by the base station on the second time-frequency resource at the second subcarrier interval; and when the searching in the different core frequency bands results that the information block is found at the second subcarrier interval, determine the second time-frequency resource, determine the first time-frequency resource on the basis of the specified relationship, and search for the information block broadcast by the base station on the first time-frequency resource at the first subcarrier interval.

16. The communication device according to claim 13, wherein the processor is further configured to:

before searching, in the different core frequency bands, for the information block broadcast by the base station at the first subcarrier interval and the second subcarrier interval, search, in a communication frequency hand of the UE, for synchronization information broadcast by the base station at the first subcarrier interval and the second subcarrier interval, wherein the synchronization information is used to indicate different core frequency bands of the base station.

17. The communication device according to claim 16, wherein the processor is further configured to:

determine the core frequency band of the first time-frequency resource in the frequency domain on the basis of the synchronization information found at the first subcarrier interval; and determine the core frequency band of the second time-frequency resource in the frequency domain on the basis of the synchronization information found at the second subcarrier interval.

* * * * *